(12) United States Patent
Ikeda

(10) Patent No.: US 7,594,115 B2
(45) Date of Patent: Sep. 22, 2009

(54) CONTENTS INFORMATION OUTPUT SYSTEM AND CONTENTS INFORMATION OUTPUT METHOD

(75) Inventor: Sotomitsu Ikeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 796 days.

(21) Appl. No.: 10/809,444

(22) Filed: Mar. 26, 2004

(65) Prior Publication Data

US 2004/0193742 A1  Sep. 30, 2004

(30) Foreign Application Priority Data

Mar. 28, 2003  (JP)  ............... 2003-092090
Feb. 26, 2004  (JP)  ............... 2004-051892

(51) Int. Cl.
 *H04L 9/32* (2006.01)
(52) U.S. Cl. ...................................... 713/170; 380/51
(58) Field of Classification Search .......... 713/170; 380/51
 See application file for complete search history.

(56) References Cited

U.S. PATENT DOCUMENTS

| 4,958,221 | A | * | 9/1990 | Tsuboi et al. | ............... | 358/538 |
| 6,409,401 | B1 | * | 6/2002 | Petteruti et al. | ............... | 400/88 |
| 6,466,329 | B1 | | 10/2002 | Mukai | ............... | 358/1.15 |
| 6,585,154 | B1 | * | 7/2003 | Ostrover et al. | ............... | 235/375 |

| 2002/0170973 | A1 | * | 11/2002 | Teraura | .............. | 235/492 |
| 2003/0035539 | A1 | * | 2/2003 | Thaxton | .............. | 380/51 |

FOREIGN PATENT DOCUMENTS

| JP | 6-44265 | 2/1994 |
| JP | 10-285378 | 10/1998 |
| JP | 11-78176 | 3/1999 |
| JP | 2000-285203 | 10/2000 |
| JP | 2001-96814 | 4/2001 |
| JP | 2001-134672 | 5/2001 |
| JP | 2002-120475 | 4/2002 |

OTHER PUBLICATIONS

U.S. Appl. No. 10/803,926, filed Mar. 19, 2004.
U.S. Appl. No. 10/795,316, filed Mar. 9, 2004.

\* cited by examiner

*Primary Examiner*—Gilberto Barron, Jr.
*Assistant Examiner*—Cordelia Kane
(74) *Attorney, Agent, or Firm*—Fitzpatrick, Cella, Harper & Scinto

(57) ABSTRACT

A contents information output system which is capable of ensuring security in outputting contents information to a recording medium. A data management apparatus identifies a RF-ID tagged display medium to which contents information is to be outputted, and determines whether or not output of contents information to the identified display medium is permitted. Further, the data management apparatus determines whether or not the contents information designated by a print instruction is registered, and an RF-ID reader-integrated printing apparatus outputs the contents information designated by the print instruction to the display medium, based on the determination by the data management apparatus.

7 Claims, 7 Drawing Sheets

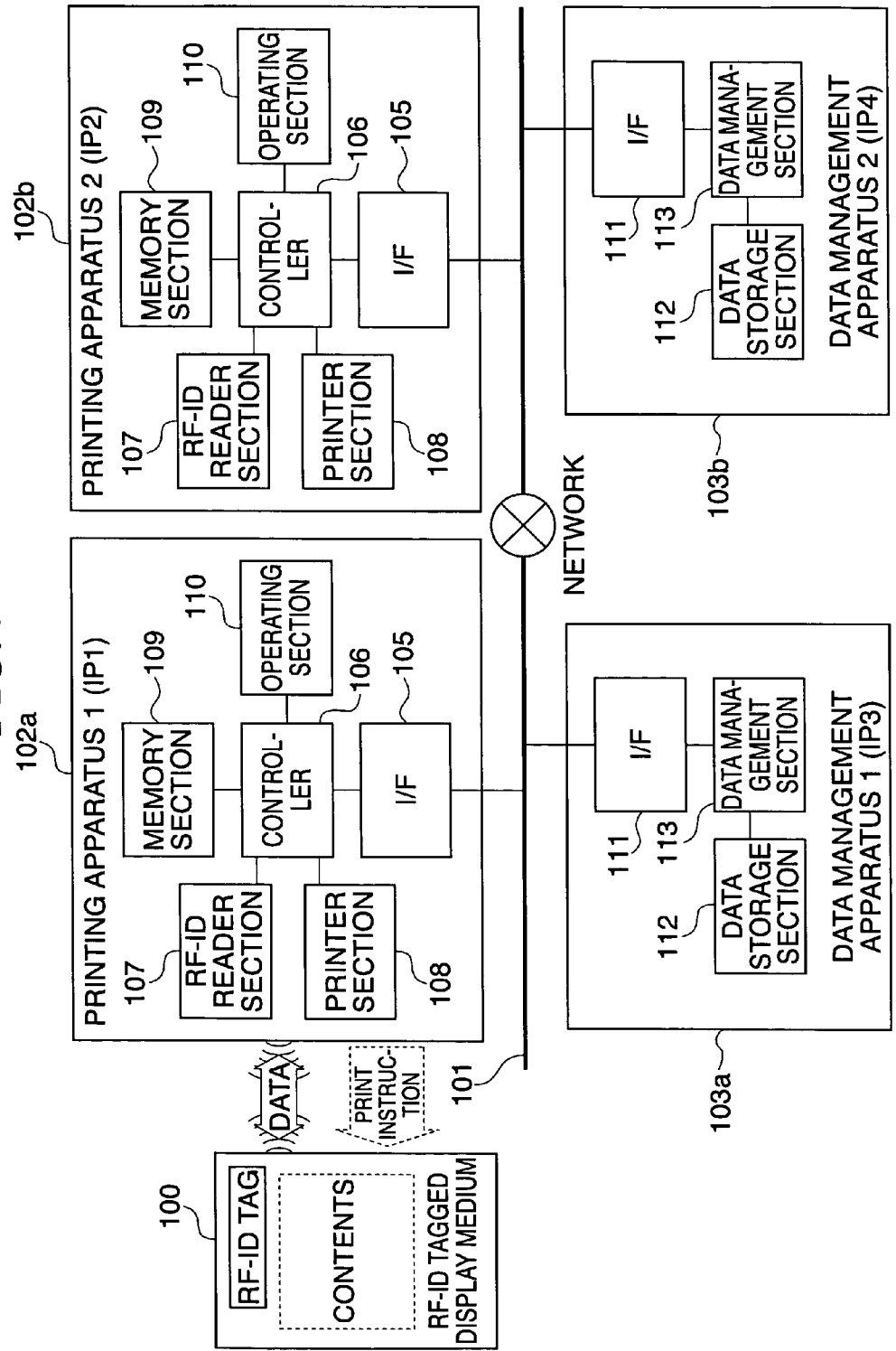

CONTENTS INFORMATION OUTPUT SYSTEM AND CONTENTS INFORMATION OUTPUT METHOD

BACKGROUND OF THE INVENTION

1. Field of the Invention

The present invention relates to a contents information output system and a contents information output method that output contents information to a recording medium.

2. Description of the Related Art

A conventional printing system is capable of printing a plurality of copies of a predetermined document by transmitting print data generated e.g. by a personal computer to a printer. More specifically, to issue certain printed matter, predetermined print contents are generated based on a program for document preparation, for example, and then the print data based on the print contents is transmitted to the printer. The printer interprets the received print data and generates image data for printout. This image data is printed on a print recording medium (display medium) supplied from a feed cassette, for example, whereby the printed matter is issued.

As to the conversion of paper information to electronic information, Japanese Laid-Open Patent Publication (Kokai) No. 2000-285203 discloses an information transmitting method using paper containing an IC chip. In this method, information printed on a sheet of paper is also stored in an IC chip attached to the sheet, and when the same information is copied to another sheet of paper, the information stored in the IC chip is read out and printed on the other sheet. Thus, the method uses paper as an electronic storage medium to distribute, exchange, and store information.

Further, Japanese Laid-Open Patent Publication (Kokai) No. H11-78176 has proposed a printed matter publication management system that prevents unauthorized publication of printed matter. This system is used for management of publication of printed matter, such as marketable securities and literary works. In this system, contents stored in a contents management apparatus are allowed to be printed on a display medium only when it is recognized that the display medium contains valid identification information, which enables management of printed matter having valid identification information. The "identification information" disclosed in the above-mentioned publication includes print information, such as letters and symbols, magnetic information, optical detection information, such as bar codes, and watermark information.

Japanese Laid-Open Patent Publication, (Kokai) No. 2001-134672 discloses a printed matter publication management system which achieves high security using an IC chip for authentication of printed matter. This system is characterized in that a printed matter-authenticating apparatus is off-line, and an authentication key for authenticating an IC chip and a decryption key for decrypting data encrypted by an encryption key are stored in advance to achieve high security. Further, this publication discloses a method of reading identification information of an IC chip attached to a sheet of paper on which contents are to be printed, determining whether or not printing on paper having the identification information has been carried out in the past, and printing the contents specific to the sheet on condition that the printing has not been carried, whereby the same contents are prevented from being printed on different sheets of paper.

Japanese Laid-Open Patent Publication (Kokai) No. 2001-96814 discloses a printer with an RF-ID reading and writing device that prints a visible bar code, readable characters, or the like, on a label, based on data read from an RF-ID tag, whereby even if writing in the RF-ID tag is unsuccessful, the operator can recognize the unsuccessful writing and retry writing.

Conventionally, in general printing systems for printing on paper, sheets on which printing or copying has been carried out are separate from a network or system, which makes it practically impossible to manage printed matter.

Japanese Laid-Open Patent Publication (Kokai) No. 2000-285203 discloses storing contents in IC chips. However, it is considered that management of contents on a network will be dominant for the following reasons:

(1) With the reduction of the size of IC chips for achievement of lower prices in future, it is expected that the memory capacity per one chip will be reduced, which sets a limit to storable contents.

(2) With increased speed and capacity of network transmission, it becomes possible to access contents managed on a network, anytime from anywhere.

(3) Management of access to contents with security is desired. Management of authorization of printing is desired.

From the above, it is expected that the application of sheets of paper containing IC chips storing contents will be limited.

The printed matter publication management system disclosed in the aforementioned Japanese Laid-Open Patent Publication (Kokai) No. H11-78176 is comprised of a medium information management apparatus, the contents management apparatus, a use management apparatus, and a printer, and three elements needed for publication of printed matter, i.e. contents, a print recording medium (display medium), and a printing mechanism, are managed independently of each other, for management of publication of printed matter. This makes it possible to prevent unauthorized publication of printed matter and perform remote printing of important printed matter, such as marketable securities, admission tickets, literary works, membership cards, certificates, and so forth. However, this system is for managing publication of printed matter from a host side, and therefore it is impossible for a user to register or modify contents, or access management information of contents.

Although the aforementioned Japanese Laid-Open Patent Publication (Kokai) No. 2001-134672 discloses the printed matter publication management system for authentication of printed matter, this system is intended to manage publication of printed matter similarly to the printed matter publication management system disclosed in Japanese Laid-Open Patent Publication (Kokai) No. H11-78176, and therefore it is impossible for a user to manage contents.

The printer with an RF-ID reading and writing device, which is disclosed in Japanese Laid-Open Patent Publication (Kokai) No. 2001-96814, is not of a type that prints the print information per se as contents.

Further, none of the above-mentioned publications discloses a method of determining not only whether or not contents information is allowed to output to a recording medium therefor, but also whether or not the contents information designated for output has been registered, and outputting the contents information designated for output to the recording medium, based on the results of the determinations.

SUMMARY OF THE INVENTION

It is a first object of the present invention to provide a contents information output system and a contents information output method which are capable of ensuring security in outputting contents information to a recording medium.

It is a second object of the present invention to provide a contents information output system and a contents information output method which are capable of managing a recording medium to which contents information was outputted and the outputted contents information in association with each other.

To attain the first object, in a first aspect of the present invention, there is provided a contents information output system that outputs contents information to an identifiable recording medium, comprising an identification apparatus that identifies a recording medium to which the contents information is to be outputted, a first determination device that determines whether or not output of the contents information to the recording medium identified by the identification apparatus is permitted, a second determination device that determines whether or not the contents information designated for output has been registered, and an output apparatus that outputs the contents information designated for output to the recording medium, based on the determination by the first determination device and the determination by the second determination device.

With this arrangement of the first aspect of the present invention, it is possible to ensure security in outputting the contents information to the recording medium.

To attain the second object, it is preferred that the contents information output system further comprises a management apparatus that controls the contents information outputted by the output apparatus and identification information of the recording medium to which the contents information has been outputted.

With this arrangement of the preferred embodiment, it is possible to manage information of the recording medium to which the contents information was outputted. Therefore, using this management information, it is possible, for example, to easily access print information registered on the network and realize management of publication of printed matter.

More preferably, the determination by the first determination device and the determination by the second determination device are carried out in cooperation with the management apparatus.

Preferably, the output apparatus is responsive to the first determination device determining that the output of the contents information to the recording medium is permitted and the second determination device determining that the contents information designated for output has been registered, for outputting the registered contents information, and the output apparatus is responsive to the first determination device determining that the output of the contents information to the recording medium is permitted and when the second determination device determining that the contents information designated for output has not been registered, for outputting the contents information designated for output.

Preferably, the output apparatus is responsive to the first determination device determining that the output of the contents information to the recording medium is permitted and the second determination device determining that the contents information designated for output has been registered, for outputting the registered contents information, and the output apparatus is responsive to the second determination device determining that the contents information designated for output has not been registered, for not outputting the contents information designated for output, regardless of the determination by the first determination device.

Preferably, the output apparatus is responsive to the first determination device determining that the output of contents information to the recording medium is not permitted, for not outputting the contents information designated for output, regardless of the determination by the second determination device.

Preferably, the contents information output system further comprises an information processing apparatus that designates the contents information for output.

Preferably, the contents information designated for output has already been outputted to the recording medium.

Preferably, the recording medium has a radio section attached thereto, and the identification apparatus identifies the recording medium by reading identification information sent from the radio section.

To attain the first object, in a second aspect of the present invention, there is provided a method of outputting contents information to an identifiable recording medium, comprising an identification step of identifying a recording medium to which the contents information is to be outputted, a first determination step of determining whether or not output of the contents information to the recording medium identified in the identification step is permitted, a second determination step of determining whether or not the contents information designated for output has been registered, and an output step of outputting the contents information designated for output to the recording medium, based on the determination in the first determination step and the determination in the second determination step.

The above and other objects, features, and advantages of the invention will become more apparent from the following detailed description taken in conjunction with the following drawings.

BRIEF DESCRIPTION OF THE DRAWINGS

FIG. 7 is a block diagram showing the arrangement of a contents sharing system using an RF-ID tagged display medium, as the contents information output system according to a third embodiment of the present invention.

DETAILED DESCRIPTION OF THE PREFERRED EMBODIMENTS

The present invention will now be described in detail below with reference to the accompanying drawings showing preferred embodiments thereof.

First, a first embodiment of the present invention will be described with reference to FIGS. 1, 2, and 3.

Figure 1:
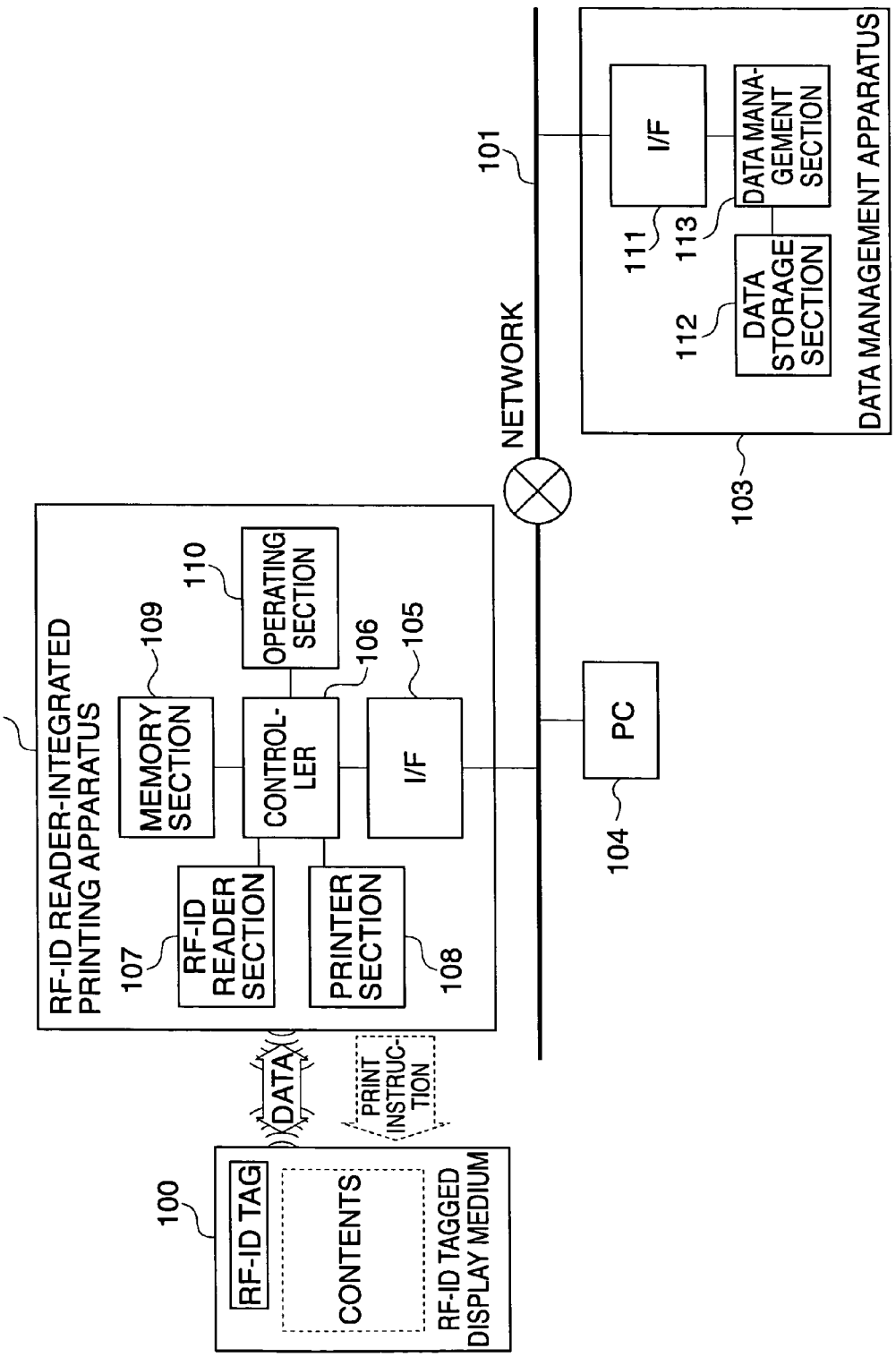
FIG. 1 is a block diagram showing the arrangement of a contents sharing system using an RF-ID tagged display medium, as the contents information output system according to a first embodiment of the present invention.

FIG. 1 is a block diagram showing the arrangement of a contents sharing system using an RF-ID tagged display medium, as the contents information output system according to the first embodiment. In FIG. 1, reference numeral 100 designates the RF-ID tagged display medium, 101 a network, 102 an RF-ID reader-integrated printing apparatus, 103 a data management apparatus, and 104 a PC (personal computer). The RF-ID reader-integrated printing apparatus 102, the data management apparatus 103, and the PC 104 are connected to the network 101.

The RF-ID tagged display medium 100 includes a tag capable of transmitting an ID number, i.e. identification information stored in an IC chip, to the RF-ID reader of the RF-ID reader-integrated printing apparatus 102 by radio. The tag is fixed to the front or reverse surface of the RF-ID tagged display medium 100 with an adhesive or the like, inserted in the RF-ID tagged display medium 100, or sandwiched between two or more sheets of the RF-ID tagged display medium.

As the display medium, there may be used any of printable display media in sheet form, including ordinary plain paper, surface-coated paper, photographic paper e.g. for photographs, heat-sensitive paper, diazo photosensitive paper, PET films for overhead projectors, films of resins, such as polyethylene and plastic, and so forth.

The RF-ID reader-integrated printing apparatus 102 is comprised of a network interface (I/F) 105, a controller 106, an RF-ID reader section 107 as an RF-ID reader, a printer section 108, a memory section 109, and an operating section 110.

The network interface 105 performs data communication via a communication line. The RF-ID reader-integrated printing apparatus 102 has an IP address assigned thereto, for identification on the network 101.

The controller 106 controls reading of RF-ID, printing, data communication, data display, data storage, and so forth, that is, controls the overall functions of the printing apparatus 102 operating at a high-speed.

The RF-ID reader section 107 reads the RF-ID tag attached to the RF-ID tagged display medium 100 by radio. The RF-ID reader section 107 is comprised of a processor section that performs control operations and data processing, an RF section that modulates transmit data and encodes received data, and an antenna section that carries out RF communication with the RF-ID tag.

The-printer section 108 includes a printer controller and a print engine, and a printing mechanism to which are applicable the electrophotographic printing method employed e.g. by copying machines and laser beam printers, the ink-jet printing method including the bubble jet (registered trademark) printing method and the piezoelectric printing method, the heat-sensitive/thermal transfer method, the wire dot printing method, etc., in short, all printing methods.

The memory section 109 is used to temporarily store ID information (identification information), contents information associated with the ID information, and management information associated with the contents information during printing, for achievement of high-speed printing and high security.

The operating section 110 is a human interface for giving a print instruction and comprised of a display section and an input section. More specifically, the display section may be a display capable of displaying at least information associated with contents, or a display with a touch panel having a surface thereof formed with a digitizer that can be used for input. Alternatively, the display section may be implemented by simple LED's (light emitting diodes) that are illuminated for indication of a processing status. The input section may be implemented by the touch panel or other devices, such as operating buttons and a voice input device. When the RF-ID reader section 107 detects supply of an RF-ID tagged display medium 100, the detection signal may be used to give a print instruction.

The RF-ID reader-integrated printing apparatus 102 may have the function of optical reading in addition to the above-mentioned functions, and include a data storage section and a data management section. Further, the RF-ID reader-integrated printing apparatus 102 may be integral with a computer. Furthermore, the RF-ID reader-integrated printing apparatus 102 may be implemented by a multifunction apparatus equipped with multiple functions, i.e. a printer function and any of the functions of a copying machine, a scanner, a facsimile machine, a telephone, and so forth.

The data management apparatus 103 is comprised of a network interface (I/F) 111, a data-storage section 112, and a data management section 113.

The network interface 111 performs data communication via the communication line. The data management apparatus 103 has an IP address assigned thereto, for identification on the network 101.

The data storage section 112 has a database of ID information of authorized RF-ID tags, and a database storing at least ID information of registered ID's, contents information associated with the ID information, and management information associated with the contents information.

The database of the identification information of the authorized RF-ID tags has such identification information registered therein and updated via the network 101 whenever an RF-ID tagged display medium 100 usable in the contents sharing system of the present embodiment is placed onto the market. This makes it possible to use the RF-ID tagged display medium 100 with guaranteed security and manage the security of the contents in printed form.

In the present embodiment, the registered identification information is intended to mean the ID number of the RF-ID tag of an RF-ID tagged display medium 100, which has been registered upon printing of contents on the RF-ID tagged display medium 100.

Further, the contents information associated with the identification information is intended to mean information printed on the RF-ID tagged display medium 100. In some cases, however, the contents information is intended to mean contents information not printed on the display medium 100 but stored on the network in association with the identification information. When the contents information is such kind of information, only a part of the contents has been printed on the RF-ID tagged display medium 100, and the information associated with the contents is stored on the network, so that it is possible to access the information, as required, so as to print the information on the RF-ID tagged display medium 100. When contents are modified, the contents information before the update and the contents information after the update may be both stored in a state associated with each other.

Further, the management information associated with the contents information includes at least contents additional data information, print additional data information, associated identification information, and security information. The contents additional data information includes the author of the contents, software used for preparing the contents, a preparation date, and information of a computer used for the preparation. The print additional data information includes the printing date of the contents, information of a printer used for printing of the contents, the range of printing, printing options, the name of a printer model, a driver version, and print properties. The associated identification information includes an RF-ID tag number attached to the RF-ID tagged display medium 100 used for printing the identical contents, or an RF-ID tag number attached to the RF-ID tagged display medium 100 used for printing modified contents of the identical contents. The security information is information of authorization of access to contents, i.e. information as to permission or inhibition of viewing, modifying, or printing of the contents.

The data management section 113 performs a data storage control process including new registration, additional registration, and modified registration, of data into the data storage section 112, control of data communication via the network 100, update of the database of the identification information of authorized RF-ID tags, and so forth.

The RF-ID tagged display medium 100 and the RF-ID reader-integrated printing apparatus 102 perform data communication by radio between the RF-ID tag and RF-ID reader section 107.

Next, the operation of the contents sharing system using the RF-ID tagged display medium, according to the present embodiment, will be described with reference to FIGS. 2 and 3.

Figure 2:
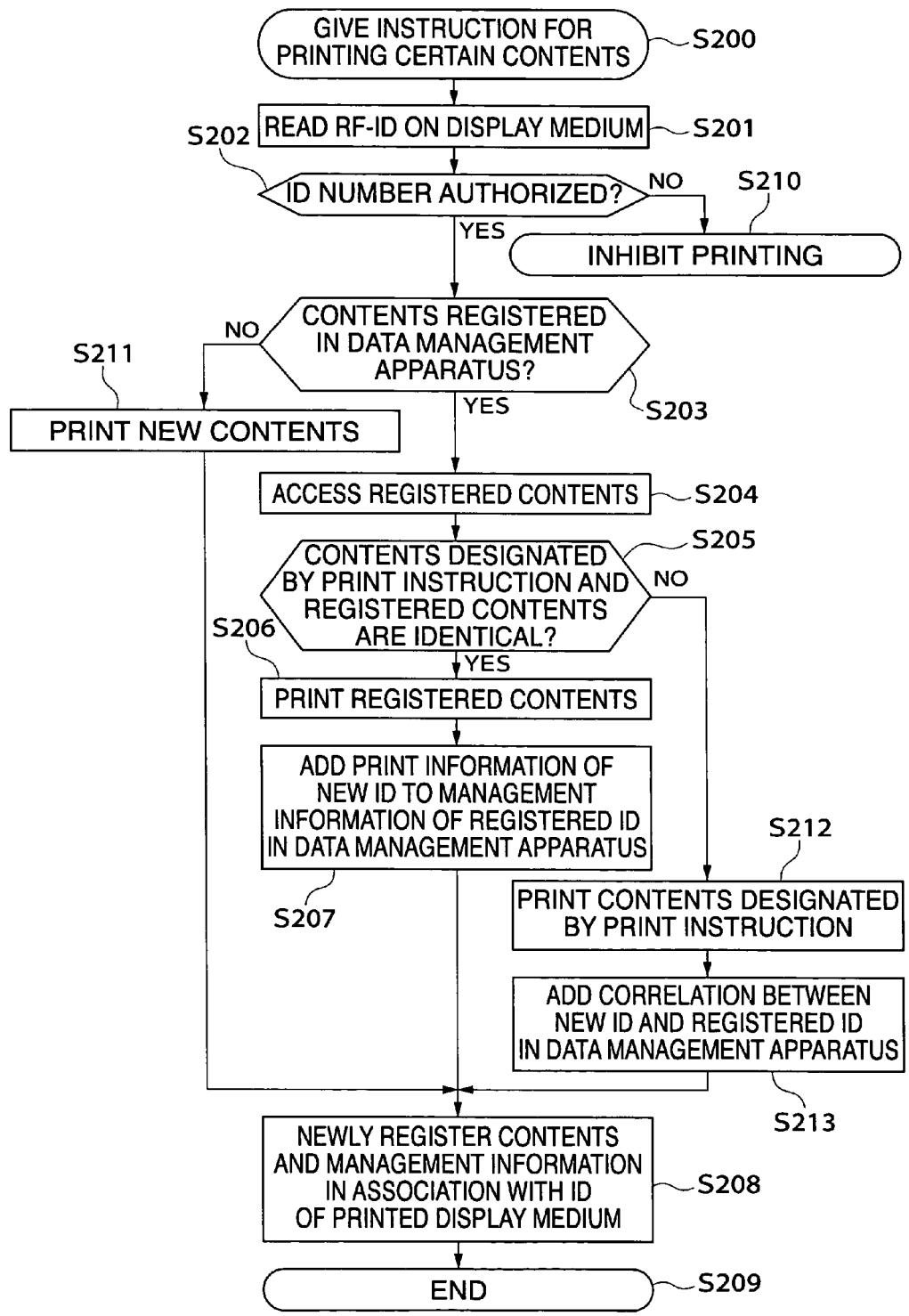
FIG. 2 is a flowchart of a printing process executed by the contents sharing system shown in FIG. 1.
Figure 3:
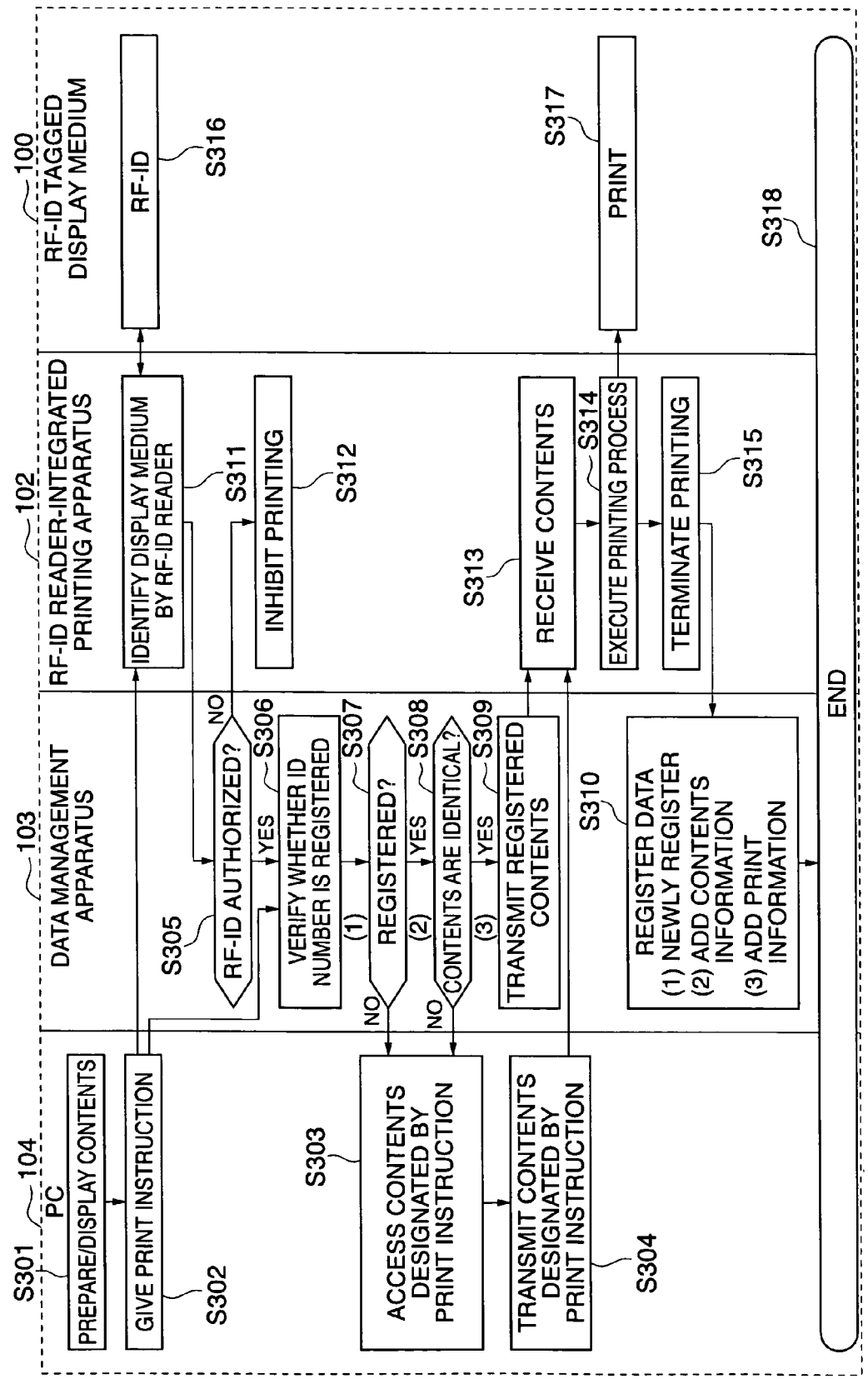
FIG. 3 is a flowchart of processes executed by apparatuses and devices of the contents sharing system in the printing process.

FIG. 2 is a flowchart of a printing process carried out by the contents sharing system according to the present embodiment, and FIG. 3 is a flowchart of processes executed by apparatuses and devices of the contents sharing system in the printing process.

(1) Verification as to Whether an RF-ID Tag Has Been Authorized

In the case of printing newly prepared contents, after preparation of the new contents, or in the case of printing existing contents, after displaying the contents or designating the file of the same (step S301 in FIG. 3), the PC 104 gives a print instruction (step S200 in FIG. 2 and step S302 in FIG. 3.). Then, the RF-ID reader-integrated printing apparatus 102 reads and confirms an RF-ID tag attached to an RF-ID tagged display medium for printing, using the RF-ID reader section 107 as the RF-ID reader. More specifically, in response to the instruction sent from the PC 104 to the RF-ID reader-integrated printing apparatus 102, the RF-ID reader-integrated printing apparatus 102 acquires identification information (RF-ID) from the RF-ID tagged display medium 100 through radio communication with the RF-ID tag (step S201 in FIG. 2 and steps S311, S316 in FIG. 3).

The identification information is sent from the RF-ID reader-integrated printing apparatus 102 to the data management apparatus 103. The data management apparatus 103 verifies whether or not the ID number as the identification information of the RF-ID tag having been read has been authorized, by comparing the read identification information with stored data of authorized identification information (step S202 in FIG. 2 and step S305 in FIG. 3). Then, if the RF-ID tagged display medium 100 has authorized identification information, the process proceeds to the following step (step S203 in FIG. 2 and step S306 in FIG. 3), whereas if the RF-ID tagged display medium 100 does not have authorized identification information or if the RF-ID tag does not respond, printing is inhibited (step S210 in FIG. 2 and step S312 in FIG. 3).

(2) Verification as to Whether the Contents are New or Have Been Already Registered, and Printing (2)-1: Contents Are New and Not Registered in the Data Management Apparatus.

Then, it is verified whether or not the contents designated by the print instruction have been registered in the data management apparatus 103 (step S203 in FIG. 2 and steps S306 and S307 in FIG. 3). If the contents designated by the print instruction have not been registered in the data management apparatus 103, this means that the file designated by the print instruction exists at least on the PC 104, and hence the PC 104, when notified by the data management apparatus 103 that the contents have not been registered, accesses the contents designated by the print instruction (step S303 in FIG. 3) and sends the contents to the RF-ID reader-integrated printing apparatus 102 (step S304 in FIG. 3). The RF-ID reader-integrated printing apparatus 102 receives the contents designated by the print instruction from the PC 104 (step S313 in FIG. 3) and prints the new contents on the RF-ID tagged display medium 100 (step S211 in FIG. 2 and step S314 in FIG. 3).

(2)-2: The Contents Have Already Been Registered in the Data Management Apparatus, But Are Not Identical to the Registered Data.

This is the case where the contents designated by the print instruction have already been registered in the data management apparatus 103, but are not identical to the registered data, i.e. the case where the contents already registered have been modified after registration and designated for printing. In other words, this is the case where it is necessary to register the already registered RF-ID information and the new RF-ID information in a state associated with each other, for data management.

In this case, first, the data management apparatus 103 accesses the registered contents (step S204 in FIG. 2) and checks whether or not the contents have been modified after registration, to thereby determine whether or not the contents designated by the print instruction and the registered contents are identical (step S205 in FIG. 2 and step S308 in FIG. 3). Then, if the former contents and the latter contents are not identical, the data management apparatus 103 notifies the PC 104 of the fact. When receiving the notification from the data management apparatus 103, the PC 104 accesses the contents designated by the print instruction (step S303 in FIG. 3) and sends the designated contents in the PC 104 to the RF-ID reader-integrated printing apparatus 102 (step S304 in FIG. 3). The RF-ID reader-integrated printing apparatus 102 receives the designated contents from the PC 104 (step S313 in FIG. 3) and prints the contents on the RF-ID tagged display medium 100 (step S212 in FIG. 2 and steps S314 and S317 in FIG. 3). After completion of the printing on the RF-ID tagged display medium 100 (step S315 in FIG. 3), the data management apparatus 103 adds information of the correlation between the registered ID (identifier) and a new ID (identifier) to the registered ID (identifier) (step S213 in FIG. 2 and step S310 in FIG. 3), followed by the process proceeding to a step S208.

(2)-3: The Contents are Registered in the Data Management Apparatus and Identical to the Registered Data.

This is the case where it is determined in the step S205 in FIG. 2 and in the step S308 in FIG. 3 that the contents designated by the print instruction and the registered contents are identical, i.e. the case where the identical contents already registered are to be additionally printed.

In this case, the data management apparatus 103 transmits the registered contents accessed in the step S204 to the RF-ID reader-integrated printing apparatus 102 (step S309 in FIG. 3). The RF-ID reader-integrated printing apparatus 102 receives the registered contents from the data management apparatus 103 (step S313 in FIG. 3) and prints the registered contents on the RF-ID tagged display medium 100 (step S206 in FIG. 2 and steps S314 and S317 in FIG. 3). After completion of the printing on the RF-ID tagged display medium 100 (step S315 in FIG. 3), the data management apparatus 103 adds the print information of the new ID to the management information of the registered ID within the data management apparatus 103 (step S207 in FIG. 2 and step S310 in FIG. 3).

(3) Data Registration

Then, in association with the ID number as the identification information of the printed RF-ID tagged display medium, the contents and the management information associated with the contents are registered anew in the data management apparatus 103 (steps S208 and S310 in FIG. 3), followed by the present process being terminated (step S209 in FIG. 2 and step S318 in FIG. 3).

In the data registration process in the step S310 in FIG. 3, if the contents designated by the print instruction have not been registered (step S307 in FIG. 3), which corresponding to the above-described case (1), the ID number of the printed display medium 100, contents information, and contents management information are registered anew. On the other hand, if the contents designated by the print instruction have already been registered but modified (step S308 in FIG. 3), which corresponds to the above-described case (2), the identification information (ID number) of the printed display medium 100, contents information, and contents management information (including the RF-ID number information of a display medium or display media corresponding to the already registered contents) are not only registered anew, but also the identification information of the newly printed display medium is added to the contents management information associated with the already registered identification information. Further, if the contents designated by the print instruction are already registered, and a duplicate thereof has been prepared (step S308 in FIG. 3), which corresponds to the above-described case (3), new registration is not carried out, but information indicative of the preparation of the duplicate is added to the contents management information.

In the present embodiment, when a print instruction for printing contents is given by the PC 104, an RF-ID tag attached to an RF-ID tagged display medium 100 is checked, and after it is verified that the RF-ID tag has been authorized, it is verified whether or not the contents designated by the print instruction have been registered in the data management apparatus 103. However, these two verification processes may be executed simultaneously or in the reverse order.

According to the contents sharing system of the present embodiment, information of a printed RF-ID tagged display medium 100 is stored in the data management apparatus 103 on the network 101, and in the present embodiment, a display medium (paper) having an RF-ID tag formed on the reverse surface thereof is used to print confidential documents to be distributed for briefing at an important meeting in a company, for example. This makes it possible to manage information of printed matter outputted from the network 101 through printing of confidential information on the special display medium (paper).

Next, a second embodiment of the present invention will be described with reference to FIGS. 4, 5, and 6.

Figure 4:
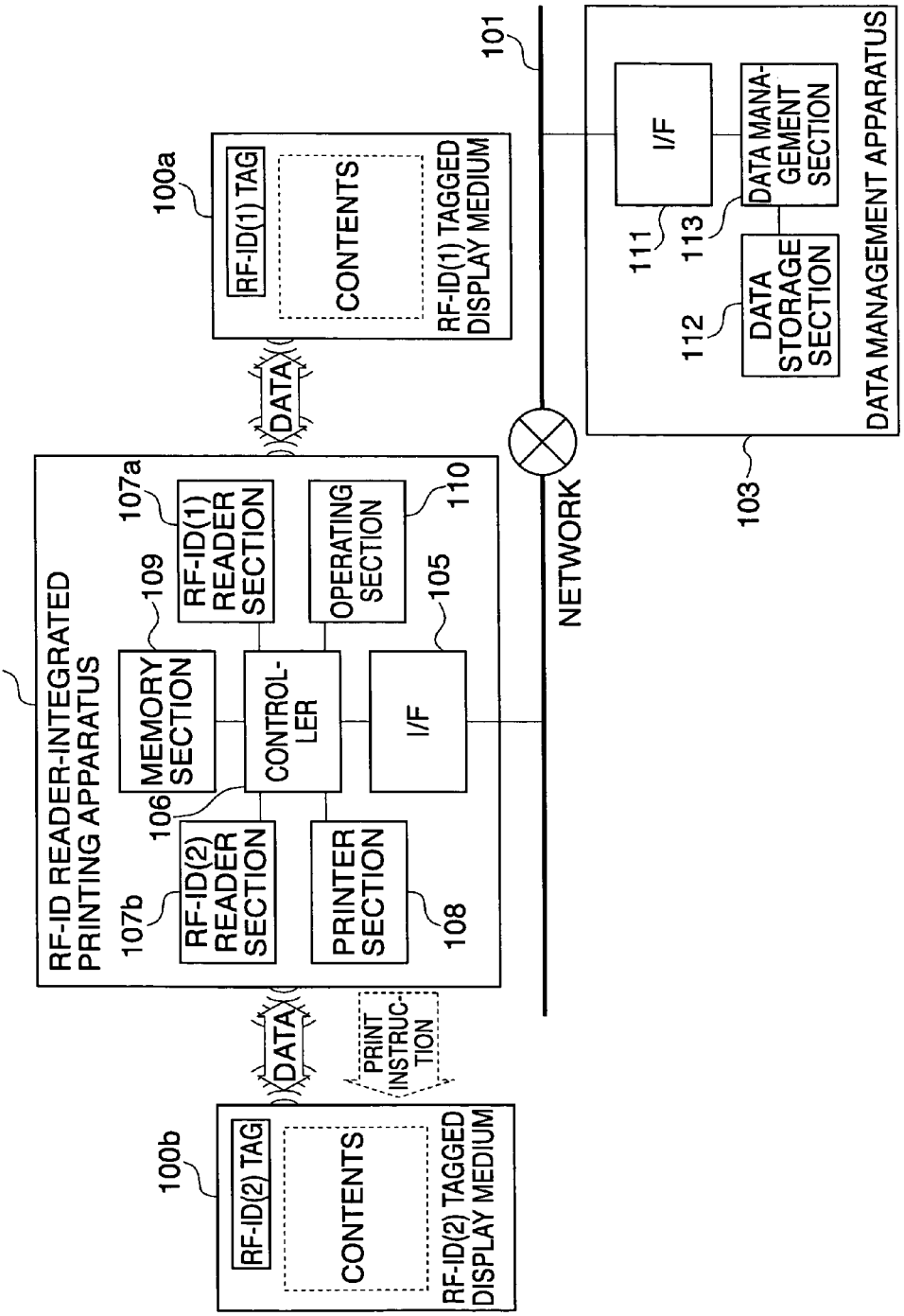
FIG. 4 is a block diagram showing the arrangement of a contents sharing system using an RF-ID tagged display medium, as the contents information output system according to a second embodiment of the present invention.

FIG. 4 is a block diagram showing the arrangement of a contents sharing system using an RF-ID tagged display medium, as the contents information output system according to the second embodiment. In FIG. 4, component elements corresponding to those in FIG. 1 according to the first embodiment are designated by identical reference numerals.

FIG. 4 is distinguished from FIG. 1 in that the PC 104 is omitted from the arrangement in FIG. 1, and the RF-ID reader-integrated printing apparatus 102 has two RF-ID reader sections 107*a* and 107*b*.

More specifically, one of the RF-ID reader sections, i.e. RF-ID(1) reader section 107*a* reads the identification information of a registered RF-ID tagged display medium 100*a*, and the other, i.e. RF-ID(2) reader section 107*b* reads the identification information of an RF-ID tagged display medium 100*b* for printing of contents.

The RF-ID tagged display mediums 100*a* and 100*b* and the RF-ID reader-integrated printing apparatus 102 perform data communication by radio between the RF-ID tags and the RF-ID reader sections 107*a* and 107*b*, respectively.

Next, the operation of the contents sharing system using the RF-ID tagged display mediums, according to the present embodiment, will be described with reference to FIGS. 5 and 6.

Figure 5:
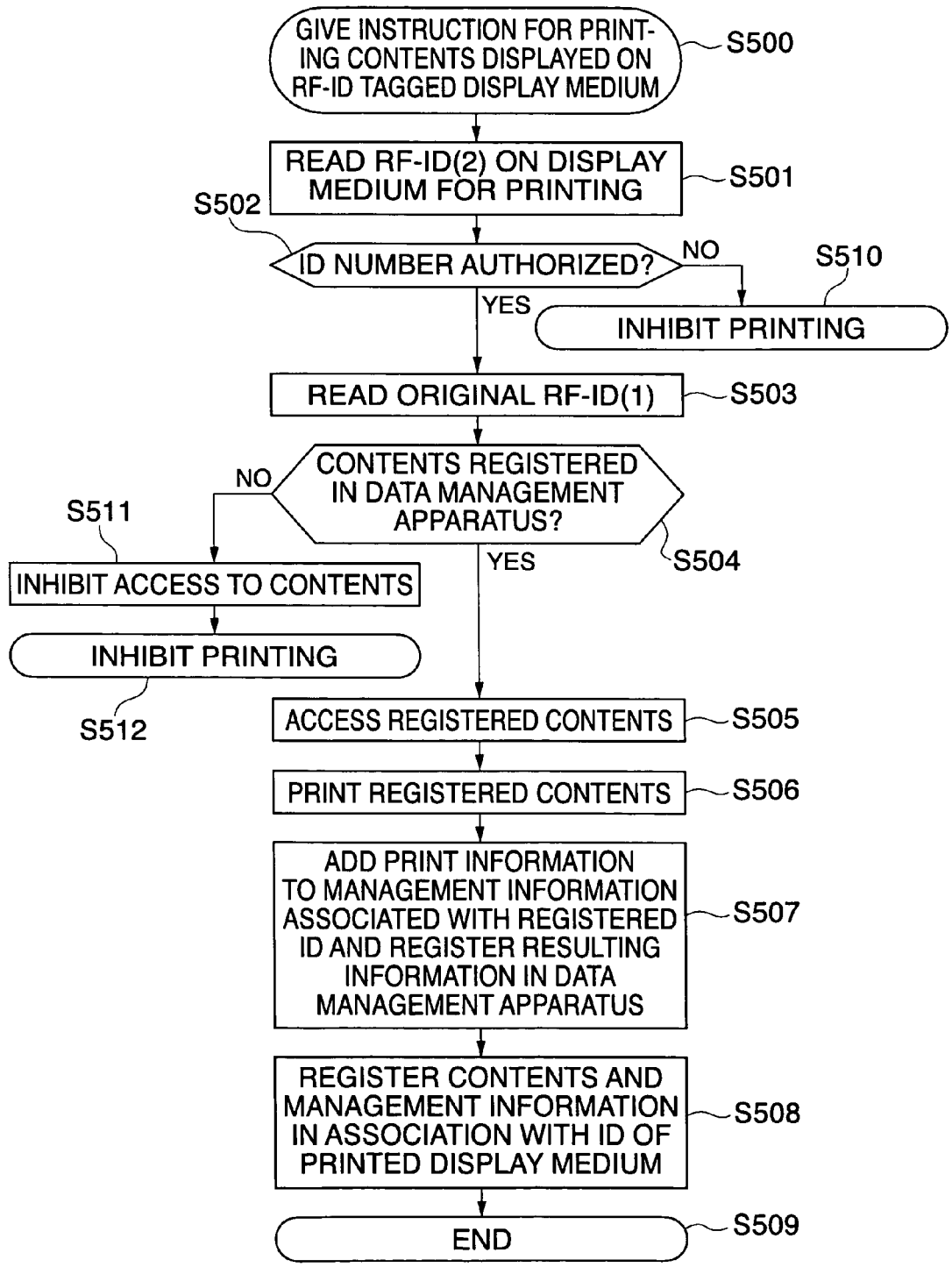
FIG. 5 is a flowchart of a printing process executed by the contents sharing system shown in FIG. 4.
Figure 6:
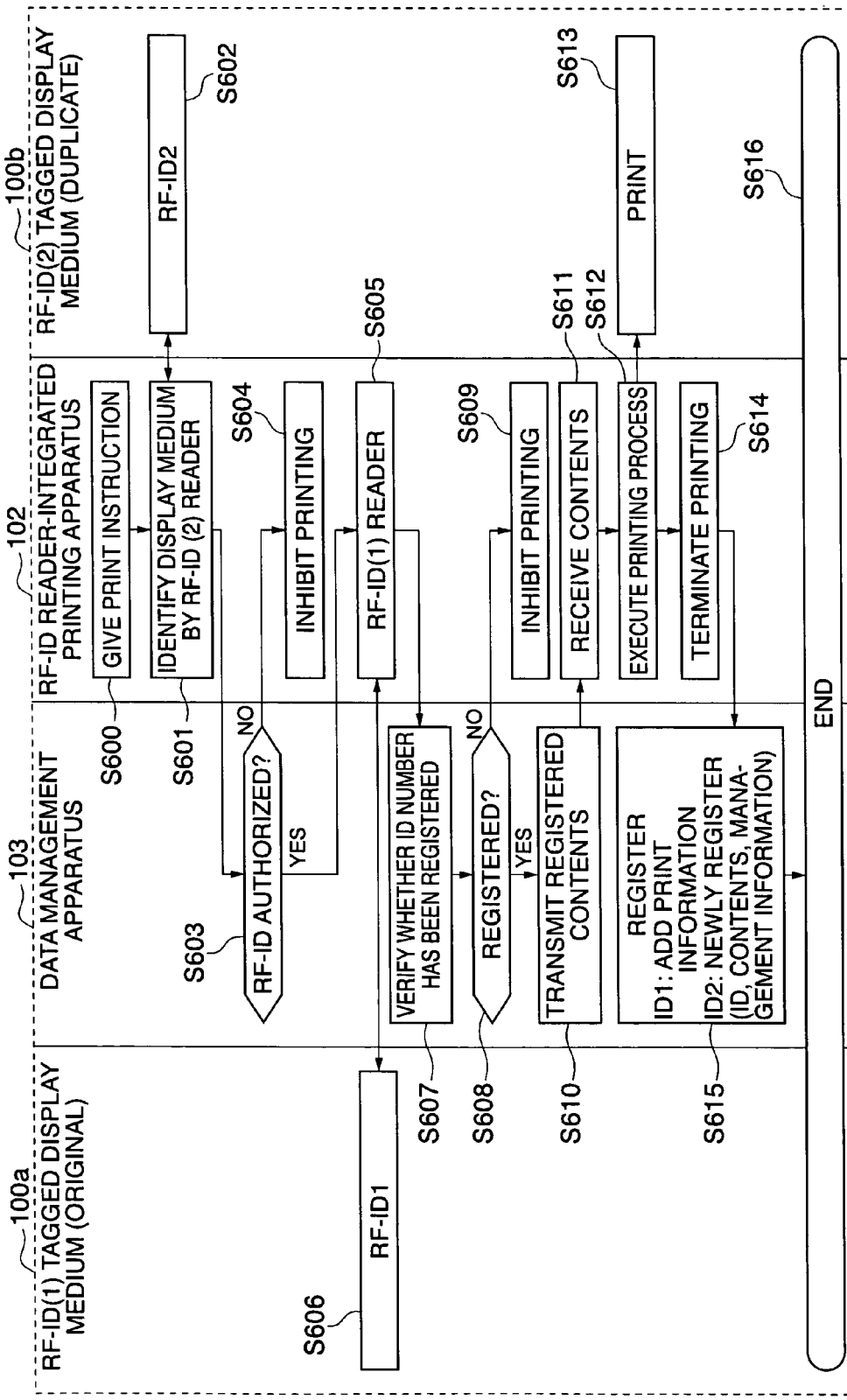
FIG. 6 is a flowchart of processes executed by apparatuses and devices of the contents sharing system in the printing process shown in FIG. 5.

FIG. 5 is a flowchart of a printing process executed by the contents sharing system according to the present embodiment, and FIG. 6 is a flowchart of processes executed by apparatuses and devices of the contents sharing system in the printing process shown in FIG. 5.

The RF-ID reader-integrated printing apparatus 102 gives a print instruction (step S500 in FIG. 5 and step S600 in FIG. 6), and reads the identification information of an RF-ID(2) tag attached to the RF-ID(2) tagged display medium 100*b* using the RF-ID(2) reader section 107*b* as the RF-ID reader, and sends the same to the data management apparatus 103 to thereby verify whether or not the RF-ID(2) tag has been authorized (step S501 in FIG. 5 and steps S601 and S602 in FIG. 6).

Then, the data management apparatus 103 determines whether or not the ID number of the RF-ID(2) tag as identification information thereof sent from the RF-ID reader-integrated printing apparatus 102 has been authorized (step S502 in FIG. 5 and step S603 in FIG. 6).

If the ID number of the RF-ID(2) tag has not been authorized, printing by the RF-ID reader-integrated printing apparatus 102 is inhibited (step S510 in FIG. 5 and step S604 in FIG. 6). On the other hand, if the ID number of the RF-ID(2) tag has been authorized, the RF-ID reader-integrated printing apparatus 102 reads the identification information of the RF-ID(1) tag attached to the RF-ID(1) tagged display medium 100*a* using the RF-ID(1) reader section 107*a* and sends the same to the data management apparatus 103 (step S503 in FIG. 5 and steps S605 and S606 in FIG. 6).

Then, the data management apparatus 103 verifies whether or not contents associated with the identification information of the RF-ID(1) tag sent from the RF-ID reader-integrated printing apparatus 102 have been registered (step S504 in FIG. 5 and steps S607 and S608 in FIG. 6).

If it is determined that the contents associated with the identification information of the RF-ID(1) tag have not been registered, access to the contents is inhibited (step S511 in FIG. 5), whereby the RF-ID reader-integrated printing apparatus 102 is unable to print the same (step S512 in FIG. 5 and step S609 in FIG. 6).

If it is determined that the contents associated with the identification information of the RF-ID(1) tag have been registered, the data management apparatus 103 accesses the registered contents (step S505 in FIG. 5) and transmits the registered contents to the RF-ID reader-integrated printing apparatus 102 (step S610 in FIG. 6). When receiving the registered contents from the data management apparatus 103 (step S611 in FIG. 6), the RF-ID reader-integrated printing apparatus 102 prints the received registered contents on the RF-ID(2) tagged display medium 100*b* (step S506 in FIG. 5 and steps S612 and S613 in FIG. 6). Then, after completion of the printing (step S614 in FIG. 6), the data management apparatus 103 registers the data (steps S507 and S508 in FIG. 5 and step S615 in FIG. 6), followed by the present process being terminated (step S509 in FIG. 5 and step S616 in FIG. 6).

In the data registration process in the step S615 in FIG. 6, the fact that new printing has been carried out on the RF-ID tagged display medium with the ID (2) of the RF-ID (2) tag added thereto is additionally written in the data management apparatus 103 in association with the ID (1) of the RF-ID (1) tag, and at the same time the contents information and the management information associated with the contents are newly registered in the data management apparatus 103 in association with the ID (2) of the RF-ID (2) tag.

According to the present embodiment, only by setting a display medium with contents printed thereon in the printing apparatus 102, a duplicate of the contents can be printed exclusively on a display medium authorized for printing. Moreover, the duplicate can be obtained without degradation in image quality and the fact that printing was carried out is registered for management, so that it is possible to realize a contents sharing system which is strictly managed and easily accessible by a user.

Next, a third embodiment of the present invention will be described with reference to FIG. 7.

FIG. 7 is a block diagram showing the arrangement of a contents sharing system using an RF-ID tagged display medium, as the contents information output system according to the third embodiment. In FIG. 7, component elements corresponding to those in FIG. 1 according to the first embodiment are designated by identical reference numerals.

FIG. 7 is distinguished from FIG. 1 in that a plurality of RF-ID reader-integrated printing apparatuses 102a and 102b and a plurality of data management apparatuses 103a and 103b are connected to the network 101 with respective different IP addresses assigned thereto.

The contents sharing system according to the present embodiment stores contents in the data management apparatuses 103a and 103b, as data groups each comprised of ID information, contents information, and management information associated with the contents information.

In the present embodiment, information indicative of an IP address where each data group is stored is added to the data group when a data storage section 112 stores the data group, and the data management apparatuses 103a and 103b are allowed to share a data table comprised of ID numbers as identification information and IP addresses, and update the data table as required.

This is the same operation as a DNS server performs on the Internet.

This characterizing function of the present embodiment is performed by the data management apparatuses 103a and 103b, but a server management apparatus that manages the data management apparatuses may be additionally provided depending the scale of the network 101.

In the present embodiment, the data groups each comprised of ID information, contents information, and management information associated with the contents information are normally stored in association with the order of the data management apparatuses optimized as a whole in view of the form of organization, the installation place, and other factors.

According to the contents sharing system of the present embodiment, the use of the RF-ID reader-integrated printing apparatuses 102a and 102b connected to the Internet and connected to any desired place makes it possible to utilize the contents sharing system more effectively.

Next, a description will be given of a fourth embodiment of the present invention.

An RF-ID reader-integrated printing apparatus in a contents sharing system according to the fourth embodiment has a function of writing identification information in an RF-ID tag attached to an RF-ID tagged display medium by electromagnetic waves.

This makes it possible to utilize an RF-ID tagged display medium having a capability of writing or rewriting in an IC chip, thereby realizing a contents sharing system protected with a higher security.

For example, when contents are printed on a display medium having an RF-ID tag formed by an IC chip with a part or all of identification information unwritten therein, and registered in the present system, the present contents sharing system is capable of encrypting the identification information. In other words, it is possible to protect an identifier (ID) as an index of contents on the network. Alternatively, when a part or all of the identification information is unwritten, the empty area of the RF-ID tag can be used for authentication.

This makes it possible to identify a person authorized to access the contents.

Further, a user is allowed to set the ID information, which enhances the usability of the present contents sharing system.

The above described embodiments are given as illustrative only of the principles of the present invention, since the spirit and scope of the present invention are not limited to the specific embodiments thereof, and all suitable modifications and equivalents may be regarded as falling within the scope of the invention as defined in the appended claims.

It is to be understood that the object of the present invention may also be accomplished by supplying a system or an apparatus with a storage medium in which a program code of software which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the embodiments described above, and hence the storage medium in which the program code is stored constitutes the present invention.

Further, it is to be understood that the functions of any of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

Further, the program has only to realize the functions of any of the above-mentioned embodiments on a computer, and the form of the program may be an object code, a program code executed by an interpreter, or script data supplied to an OS (Operating System). Examples of the storage medium for supplying the program code include a RAM, an NV-RAM, a floppy (registered trademark) disk, a hard disk, an optical disk, a magnetic-optical disk, a CD-ROM, a CD-R, a CD-RW, a DVD-ROM, a DVD-RAM, a DVD–RW, or a DVD+RW, a magnetic tape, a nonvolatile memory card, and a ROM. Alternatively, the program may be downloaded via a network from another computer, a database, or the like, not shown, connected to the Internet, a commercial network, a local area network, or the like.

The arrangements and advantageous effects of the above described first to fourth embodiments will be summarized below.

1. The contents sharing system according to the present invention is comprised of the RF-ID reader-integrated printing apparatus having the function of printing contents information on a display medium with an RF-ID tag and the function of reading identification information of the RF-ID tag through radio communication, and the data management apparatus that manages the contents information in association with the identification information, and the data management apparatus manages the contents information printed on the display medium by the RF-ID reader-integrated printing apparatus in association with the identification information of the RF-ID tag.

With this arrangement 1, contents information printed on a display medium, the printing history of the contents information, and the existing status and the like of printed matter can be managed, which makes it possible to share printed contents with high security as if the printed contents were also connected to the network. Further, it is possible to easily produce printed matter which a user must take care in respect of security thereof. Furthermore, in preparing a duplicate of printed matter, it is possible to produce the same printed matter as the original without degrading image quality thereof. Moreover, a person in charge of managing contents can view print information of the contents, which enables the person to manage all printed matter associated with the contents.

2. In the contents sharing system with the arrangement 1, when the RF-ID reader-integrated printing apparatus prints contents information stored in an electronic information storage medium other than the data management apparatus, on a display medium with the RF-ID tag, the data management apparatus newly stores the contents information in association with the identification information of the RF-ID tag, together with management information associated with the contents information.

With this arrangement 2, contents information electronically generated by a PC or the like is not registered in the contents sharing system at first. In this case, after the contents are printed on an RF-ID tagged display medium, the identification information, the contents information, and the management information associated with the contents information can be registered in the data management apparatus.

This arrangement 2 enables a user to freely use the security-controlled contents sharing system to handle contents prepared by the user himself/herself.

3. The contents sharing system with the arrangement 1 includes a rewrite means for rewriting management information associated with the identification information of a first RF-ID tag and that of a second RF-ID tag such that the identification information of the first RF-ID tag and that of the second RF-ID tag can be associated with each other, when the contents information stored in the data management apparatus together with the management information in association with the identification information of the first RF-ID tag is printed on a display medium with the second RF-ID tag.

With this arrangement 3, a user can produce a duplicate of contents registered in the present contents sharing system on a display medium with an RF ID tag authorized for printing and the fact of production of the duplicate is stored as management information. This makes it possible to grasp the date of production, number of copies, status, history, and so forth of the duplicate, and manage history information of the original display medium and that of its duplicate by associating them with each other.

4. In the contents sharing system with the arrangement 3, when printing a duplicate of the contents information stored in the data management apparatus together with the management information in association with the identification information of a third RF-ID tag, on a display medium with a fourth RF-ID tag, the RF-ID reader-integrated printing apparatus reads the identification information of the third RF-ID tag, to thereby print the contents information stored in the data management apparatus in association with the identification information of the third RF-ID tag on the display medium with the fourth RF-ID tag. The rewrite means rewrites the management information associated with the identification information of the third RF-ID tag and that of the fourth RF-ID tag such that the identification information of the third RF-ID tag and that of the fourth RF-ID tag are associated with each other.

With this arrangement 4, it is possible not only to easily produce a duplicate of printed matter at hand without degradation in image quality thereof, which inevitably occurs when printing is carried out after optical reading by a conventional copying machine, but also to manage the duplicate with high security.

5. In the contents sharing system with the arrangement 1, a plurality of data management apparatuses and a plurality of RF-ID reader-integrated printing apparatuses are connected via a network, so that at least data groups each comprised of all the contents information, the management information associated with the contents information, and the identification information of the RF-ID tags, which are stored in the data management apparatuses, can be shared. A desired piece of the contents information can be printed by each of the RF-ID reader-integrated printing apparatuses.

With this arrangement 5, the present contents sharing system can be realized on an enlarged scale with a plurality of data management apparatuses and a plurality of RF-ID reader-integrated printing apparatuses being connected via a network. That is, the contents information output system on an enlarged scale can be realized in which the plurality of data management systems can share at least the data groups each comprised of all the contents information, the management information associated with the contents information, and the identification information of the RF-ID tags, which are stored in the data management apparatuses. More specifically, this is possible, for example, by providing each data management apparatus with the function of always sharing each ID number as identification information and the IP address of one of the data management apparatuses that stores contents information associated with the ID number, as is the case where IP addresses are shared by DNS servers on the Internet, or alternatively by additionally providing a server, which is similar to a DNS server, for managing ID numbers and the IP addresses of the data management apparatuses storing contents information associated with the ID numbers.

6. In the contents sharing system according to the present invention, the printing apparatus having the function of printing contents information on a display medium with an RF-ID tag is comprised of a reading means for reading identification information of the RF-ID tag by radio communication, an ID information transmission means for transmitting the identification information of the RF-ID tag read by the reading means to a data management apparatus, a reception means for receiving the contents information from the data management apparatus, a printing means for printing the contents information received by the reception means, and a printing termination notification means for notifying the data management apparatus of termination of a printing process by the printing means.

With this arrangement 6, it is possible to use an authorized RF-ID tagged display medium, as well as to associate printed contents information and the identification information of the RF-ID tag with each other.

7. The contents sharing system with the arrangement 6 includes an identification information writing means for writing identification information in the RF-ID tag attached to the display medium, using electromagnetic waves.

With this arrangement 7, it is possible to use an RF-ID tagged display medium having the function of writing or rewriting in an IC chip, thereby realizing a contents sharing system protected with high security. That is, in addition to the use of the identification information, it is possible to perform encryption or authentication using a write memory area, for security purposes. Further, a functional section for writing in an RF-ID tag may be identical to, integral therewith, or formed separately from a functional section for reading, but it is preferred that these functional sections are identical.

What is claimed is:

1. A contents information output system that outputs contents information to an identifiable recording medium, comprising:
    an identification device adapted to identify a recording medium to which contents information is to be printed;
    a first determination device adapted to determine whether or not it is authorized to output the contents information to the recording medium identified by said identification device;
    a second determination device adapted to determine whether or not the contents information to be output is registered and further to determine, when it is determined that the contents information to be output is registered, whether or not the registered contents information is corrected;
    an output device operable where it is determined by said first determination device that it is authorized to output the contents information to the recording medium identified by said identification device, so that when it is determined by said second determination device that the contents information to be output is registered but not corrected, first output processing is performed for outputting the registered contents information, which is registered but not corrected to the recording medium, and so that when it is determined by said second determination device that the contents information to be output is registered and corrected, second output processing is performed for outputting the contents information, which is registered and corrected, to the recording medium; and
    a managing device adapted to operate in the case where the first output processing is performed by said output device, to manage identification information of the recording medium identified by said identification device and the contents information output in the first output processing in association with each other, and in the case where the second output processing is performed by said output device, to manage the identification information of the recording medium identified by said identification device, the contents information output in the second output processing, and the contents information before being corrected in association with each other.

2. A contents information output system according to claim 1, wherein the determination determined by said first determination device and the determination determined by said second determination device are performed by said managing device.

3. A contents information output system according to claim 1, wherein, in the case where it is determined by said first determination device that it is authorized to output the contents information to the recording medium and it is determined by said second determination device that the contents information to be output is not registered, said output device is adapted to output the contents information to be output.

4. A contents information output system according to claim 1, wherein, regardless of the determination by said second determination device, in the case where the recording medium is a medium which is not to be authorized to output the contents information, said output device is adapted to cancel outputting the contents information to be output.

5. A contents information output system according to claim 1, wherein the contents information to be output is a contents information designated by a information processing apparatus connected to the system.

6. A contents information output system according to claim 1, wherein said identification device is adapted to identify the identification information of the recording medium by reading an identification information sent from a radio apparatus attached to the recording medium.

7. A contents information output method for outputting contents information to an identifiable recording medium, comprising:
    an identification step of identifying a recording medium to which contents information is to be printed;
    a first determination step of determining whether or not it is authorized to output the contents information to the recording medium identified in said identification step;
    a second determination step of determining whether or not the contents information to be output is registered and further determine, when it is determined that the contents information to be output is registered, whether or not the registered contents information is corrected;
    an output step to be executed, in the case where it is determined in said first determination step that it is authorized to output the contents information to the recording medium identified in said identification step, so that when it is determined in said second determination step that the contents information to be output is registered but not corrected, first output processing is performed for outputting the registered contents information, which is registered but not corrected, to the recording medium, and so that when it is determined in said second determination step that the contents information to be output is registered and corrected, second output processing is performed for outputting the contents information, which is registered and corrected to the recording medium; and
    a managing step to be executed, in the case where the first output processing is performed in said output step, for managing identification information of the recording medium identified in said identification step and the contents information output in the first output processing in association with each other, and in the case where the second output processing is performed in said output step, for managing the identification information of the recording medium identified in said identification step, the contents information output in the second output processing, and the contents information before being corrected in association with each other.

* * * * *